United States Patent
Willmot et al.

(10) Patent No.: US 7,028,572 B2
(45) Date of Patent: Apr. 18, 2006

(54) PITCH TRANSFER GEAR AND TRANSMISSIONS

(75) Inventors: Eric P Willmot, Mount Eliza (AU); David Ellis, Carrum Downs (AU)

(73) Assignee: Aimbridge Pty Ltd., Melbourne (AU)

(*) Notice: Subject to any disclaimer, the term of this patent is extended or adjusted under 35 U.S.C. 154(b) by 110 days.

(21) Appl. No.: 10/468,709

(22) PCT Filed: Feb. 21, 2002

(86) PCT No.: PCT/AU02/00177

§ 371 (c)(1),
(2), (4) Date: Aug. 21, 2003

(87) PCT Pub. No.: WO02/066861

PCT Pub. Date: Aug. 29, 2002

(65) Prior Publication Data

US 2004/0079183 A1    Apr. 29, 2004

(30) Foreign Application Priority Data

Feb. 23, 2001  (AU)  .................... PR3303
Feb. 23, 2001  (AU)  .................... PR3304

(51) Int. Cl.
    F16H 35/02    (2006.01)
    F16H 35/06    (2006.01)
    F16H 3/38     (2006.01)
    F16H 55/17    (2006.01)

(52) U.S. Cl. .................. 74/393; 74/395; 74/340; 74/460

(58) Field of Classification Search .............. 74/393, 74/395, 412 R, 421 R, 424.5, 425–427, 460, 74/468, 340, 348–349

See application file for complete search history.

(56) References Cited

U.S. PATENT DOCUMENTS

| 2,424,873 | A |   | 7/1947  | Abbrecht |
| 3,906,809 | A |   | 9/1975  | Erickson |
| 4,050,324 | A | * | 9/1977  | Teyssandier ............. 74/397 |
| 4,842,569 | A |   | 6/1989  | Orr |
| 5,226,854 | A |   | 7/1993  | Hauser |
| 5,713,813 | A | * | 2/1998  | von Greyerz ............ 475/257 |
| 6,641,499 | B1| * | 11/2003 | Willmot ................... 475/172 |

FOREIGN PATENT DOCUMENTS

| DE | 3049230 A1    | 7/1982  |
| GB | 507030        | 6/1939  |
| GB | 2 095 773 A   | 10/1982 |
| WO | WO 95/33146 A1| 12/1999 |
| WO | WO 02/093036 A2| 11/2002 |

* cited by examiner

*Primary Examiner*—Tisha Lewis
(74) *Attorney, Agent, or Firm*—Senniger Powers

(57) ABSTRACT

A pitch transfer gear transmission which enables drive to be transmitted from a gear of having one modulus (42) to a gear having another modulus (46) includes at least two gears (12,16) which have a different number of teeth and which are able to rotate relative to one another, so that the teeth of the two gears (12,16) can form a gear modulus of a first value at one part of the periphery of the gear, and a gear modulus of another value at another part of the periphery of the gear. Continuously variable transmissions are formed by providing an input or output gear (42,46) which has a modulus which varies along the length of the gear. Pitch transfer gear assembly (30) engages with the input or output gear (42,46), and is moveable by a mechanism (59) along the length of the gear changing modulus, so as to set the drive ratio of the transmission.

5 Claims, 17 Drawing Sheets

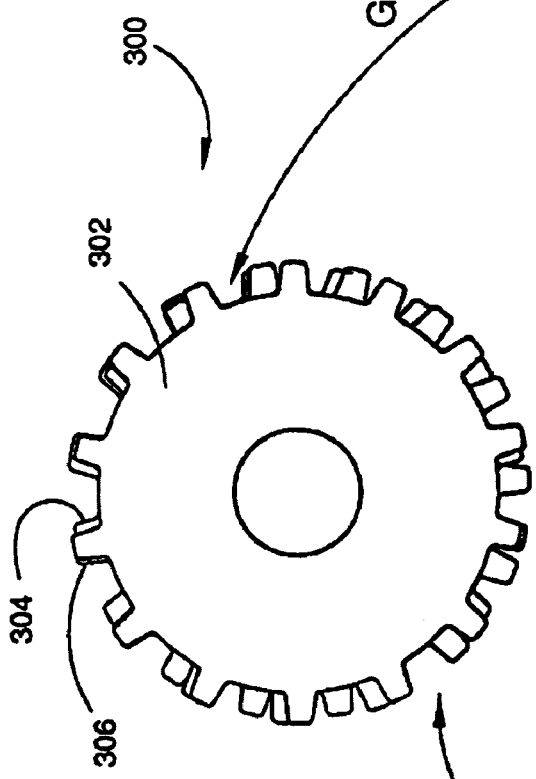
FIG. 5A
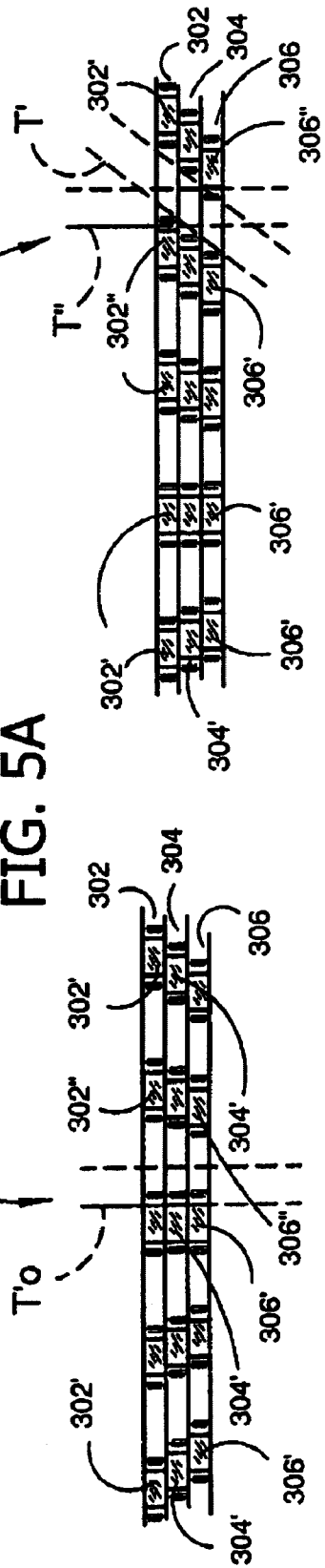
FIG. 5C
FIG. 5B

PITCH TRANSFER GEAR AND TRANSMISSIONS

FIELD OF THE INVENTION

This invention relates to a pitch transfer gear and to transmissions which can utilise the pitch transfer gear in order to transmit drive from an input to an output.

BACKGROUND ART

Transmissions utilising gear systems are, of course, well known and used in almost all industries. Generally, in order to engage one gear with another gear it is necessary that the gears have the same diametric pitch if they are of involute gear form. The same can be said for modulus as used in the metric system. In this description, the word modulus will be used to refer to the relationship between pitch and tooth diameter, even though they related to teeth or profiles of other involutes. Throughout this specification the words modulus will be used. If the gears have teeth of different modulus, it is generally not possible for the gears to engage and obey the fundamental law of rolling gears and transmit drive one to another.

SUMMARY OF THE INVENTION

The invention may be said to reside in a transmission including:
  an input;
  an output;
  at least one of the input and output having an elongate gear drive element which changes in characteristic from one location to another location on the element to facilitate a change in drive ratio;
  a transfer gear assembly having a first gear and a second gear, the first gear having a first plurality of gear teeth and the second gear having a second plurality of gear teeth different in number to the first plurality, the first and second gears being in meshing engagement with the gear drive element between said one location and said another location, and wherein the drive ratio of the transmission depends on the location at which the first gear and second gear engage the elongate gear teeth between the said one location and the said another location, the first gear and second gear being coupled to the other of the input or output for receiving drive from, or transmitting drive to, the other of the input and output; and
  control means for moving the transfer gear assembly relative to the elongate gear drive element to thereby position the first and second gears at a desired location between the said one location and the said another location to set the drive ratio of the transmission.

In one embodiment of the invention, the elongate gear drive element is a worm gear, and the change in characteristic is provided by a change in the pitch or helical angle of a gear thread on the worm gear.

However, in the preferred embodiment of the invention, the elongate gear drive element is an elongate gear having gear teeth, and the change in characteristic is provided by a change in modulus of the gear teeth along the gear teeth from the said one location to the said another location.

In one embodiment of the invention, the first gear and the second gear are arranged in side-by-side relationship and have a common centre point about which the first and second gears are able to rotate.

In another embodiment of the invention, the first and second gears are separate from one another and are mounted for rotation about different centre points.

In the latter mentioned embodiment, the first and second gears are preferably arranged in the same plane so that the first and second gears mesh with the elongate gear drive element on a common pitch circle diameter of the elongate gear drive element.

In one embodiment, the output is provided with the elongate gear teeth and the elongate gear teeth are provided on a conical output gear having a conical outer surface, the elongate gear teeth being formed in the conical outer surface and being provided with a change in modulus by the gear teeth diverging relative to one another from a first end of the conical gear to a second end of the conical gear.

Preferably the first and second gears are mounted on gear shafts, the gear shafts carrying pinion gears for meshing with a drive gear on the other of the input or output.

Preferably a plurality of transfer gear assemblies is provided, each transfer gear assembly having a said first gear and a said second gear.

Preferably the gear shafts include splines for mounting the first and second gears so that the first and second gears can slide on the shafts and move along the elongate gear teeth upon actuation of the control means.

In one embodiment, the splines are straight and substantially parallel with the axis of the shaft.

In another embodiment, the splines may be helical so that longitudinal movement of the first and second gears along the shafts causes a rotation of the gears relative to the shaft.

In other embodiments, both the input and output are provided with elongate gear teeth and the transfer gear assembly meshes with the elongate gear teeth of both the input and the output.

In another embodiment of the invention, the input and output are provided with toroidal gear faces, each having said elongate gear teeth, the control means being connected to the transfer gear assembly for rotating the transfer gear assembly to thereby cause the first and second gears to move along the elongate gear teeth between said one location and said another location.

In one embodiment of the invention, the gear teeth of the first and second gears includes bearings for engaging the elongate gear teeth.

The invention, in a further aspect, provides a pitch transfer gear assembly for transferring drive between gears which have different modulus.

The invention, therefore, may be said to reside in a pitch transfer gear assembly for transmitting drive from one gear having gear teeth separated by a first pitch and another gear having gear teeth separated by a second pitch, said transfer gear assembly including:
  at least a first gear having a plurality of teeth;
  at least a second gear having a plurality of teeth different in number to the teeth of the first gear;
  the first and second gears being arranged in side by side relationship so that the teeth of the first gear and the teeth of the second gear overlap one another with the teeth of the first gear and the teeth of the second gear being out of phase with one another;
  the first gear and the second gear being arranged for rotation independently of one another;
  wherein at one position about the circumference of the first and second gears, the gear teeth of the first gear and the gear teeth of the second gear are out of phase with respect to one another by a certain amount and wherein the teeth of said one gear is able to engage the transfer gear assembly by a tooth of said one gear engaging in the space between a gear tooth of the first gear and a gear tooth of the second gear;

wherein at another location about the circumference of the first and second gears a further gear tooth of the first gear and a further gear tooth of the second gear have a phase relationship different to that at said one position, and a tooth of the said another gear is able to engage in the space between one of the teeth of the first gear and one of the teeth of the second gear; and wherein as drive is transmitted from the one gear via the transfer gear to the other gear the first gear of the transfer gear assembly advances with respect to the second gear of the transfer gear assembly.

Thus, according to this aspect of the invention a gear having a first pitch, such as a mod 1.5 can engage and drive the transfer gear assembly and the transfer gear assembly can engage and drive a second gear of mod 3.

Preferably the difference in number between the teeth on the first gear and the teeth on the second gear is one.

In one preferred embodiment of the invention the number of teeth on the first gear is 14 and the number of teeth on the second gear is 15.

In one embodiment of the invention the transfer gear assembly includes a third gear having a plurality of teeth different in number to the number of teeth of the first and second gears, the third gear being arranged in side by side relationship with the first and second gears and the gear teeth of the third gear being out of phase with respect to the teeth of the first gear and the second gear.

Preferably the said one position about the circumference of the first and second gears is a position at which a tooth of the first gear and a tooth of the second gear are out of phase with respect to one another by a maximum amount thereby providing a minimum modulus or pitch, and at said another position a gear tooth of the first gear and a gear tooth of the second gear are in registry or in phase with one another thereby providing a maximum pitch or modulus between adjacent teeth of the first and second gears.

Thus, this aspect of the invention has great application in transmitting drive from one gear having a particular modulus or pitch to another gear having a different modulus or pitch.

A second aspect of the invention relates to transmissions utilising a transfer gear assembly.

This aspect of the invention may be said to reside in a transmission including:

an input for receiving input rotary power;

an input gear coupled to the input and having elongate gear teeth, the gear teeth at one end having a first pitch or modulus and at the other end a second pitch or modulus different to the first pitch or modulus, the modulus gradually changing along the length of the elongate gear teeth from said one end to said other end;

an output for providing output rotary power;

an output gear coupled to the output, the output gear having elongate gear teeth, the gear teeth having a first modulus at one end and a second modulus at the other end different to the first modulus, the modulus gradually changing along the length of the elongate gear teeth from said one end to said other end;

a transfer gear assembly engaging the gear teeth of the first and second gear, the gear assembly having a first gear and a second gear, the first and second gears having different numbers of gear teeth with the gear teeth being out of phase with one another so that at one point on the circumference of the transfer assembly the gear teeth of the first gear and the gear teeth of the second gear define a gear modulus of one particular value and at a different point on the circumference of the transfer gear assembly the gear teeth of the input gear and the gear teeth of the output gear define a second different modulus so that the transfer gear is able to engage the gear teeth of the first gear and the second gear at prescribed distances along the length of the input and output gears and at positions where the modulus or pitch of the input gear and the modulus or pitch of the output gear are different to one another; and control means for moving the transfer gear assembly relative to the input gear and the output gear to different positions along the length of the elongate teeth to thereby change the drive ratio of the transmission.

Thus, a transmission is provided which can provide continuously variable change in ratio from a minimum ratio to a maximum ratio by simply adjusting the position of the transfer gear assembly along the length of the elongate gear teeth.

In one embodiment, the control means comprises a block member for supporting the transfer gear assembly, a screw thread engaging the block and a control member on the screw thread for rotating the screw thread to thereby draw the block and therefore the transfer gear assembly along the elongate gear teeth of the input gear and the output gear.

In another embodiment the transfer gear assembly is mounted on a support shaft and a gear is connected to the support shaft so that rotation of the gear rotates the support shaft to change the position of the transfer gear assembly.

In one embodiment of the invention the input and output gears are conical gears having a large diameter end and a small diameter end, the gear teeth extending from the large diameter end to the small diameter end with the gear teeth having a large pitch or modulus at the large diameter end and a small pitch or modulus at the small diameter end, the input gear and output gear being arranged such that the small diameter end of one of the gears is adjacent the large diameter end of the other of the gears so that the input gear and output gear have adjacent surfaces which are parallel with one another.

In another embodiment of the invention the input gear and output gear have an annular surface and the gear teeth are cut in the annular surface from an inner circumferential point of the annular surface to an outer circumferential point of the annular surface, the gear teeth having a pitch or modulus adjacent the inner circumferential point which is smaller than the pitch or modulus adjacent the outer circumferential point, the transfer gear assembly being moveable between the inner circumferential point and outer circumferential point to set the drive ratio of the transmission and the input gear and the output gear being arranged such the inner circumferential point is arranged adjacent or opposite the outer circumferential point of the output gear.

In a still further embodiment of the invention the input gear and output gear have a toroidal surface and the output gear has a toroidal surface, the gear teeth of the input gear being formed in the toroidal surface so that the gear teeth curve from an outer circumferential point to an inner circumferential point, the teeth having a pitch or modulus adjacent an inner circumferential point, and a pitch or modulus adjacent an outer circumferential point which is different to the pitch or modulus at the inner circumferential point, the transfer gear assembly being mounted on a shaft so that the transfer gear assembly can be rotated so that the transfer gear assembly can engage the teeth of the input gear and the teeth of the output gear and move along the length of the teeth of the input gear and output gear between a position where the transfer gear assembly engages an outer circumferential point of the input gear and an inner circumferential point of the output gear, and a position where the transfer gear assembly engages the outer circumferential point of the output gear and the inner circumferential point of the input gear.

Preferably the difference in number between the teeth on the first gear and the teeth on the second gear is one.

In one preferred embodiment of the invention the number of teeth on the first gear is 14 and the number of teeth on the second gear is 15.

Preferably the said one position about the circumference of the first and second gears is a position at which a tooth of the first gear and a tooth of the second gear are out of phase with respect to one another by a maximum amount thereby providing a minimum modulus or pitch, and at said another position a gear tooth of the first gear and a gear tooth of the second gear are in registry or in phase with one another thereby providing a maximum pitch or modulus between adjacent teeth of the first and second gears.

In one preferred embodiment of the invention the input gear is coupled to a planetary gear system for increasing the ratio range of the transmission.

BRIEF DESCRIPTION OF THE DRAWINGS

Preferred embodiments of the invention will be described, by way of example, with reference to the accompanying drawings in which:

FIG. 5A is a view of a transfer gear according to another embodiment of the invention;

FIGS. 5B and 5C are side views of the transfer gear of FIG. 5A from the direction of arrows G and F respectively.

DESCRIPTION OF THE PREFERRED EMBODIMENTS

With reference to FIGS. 1 to 5 of the drawings, a transfer gear assembly for transferring drive from a gear having a first pitch or modulus to a gear having a second pitch or modulus is shown. The transfer gear assembly illustrated with reference to FIGS. 1 to 5 is used in various transmissions disclosed with reference to FIGS. 6 to 16.

Figure 1:
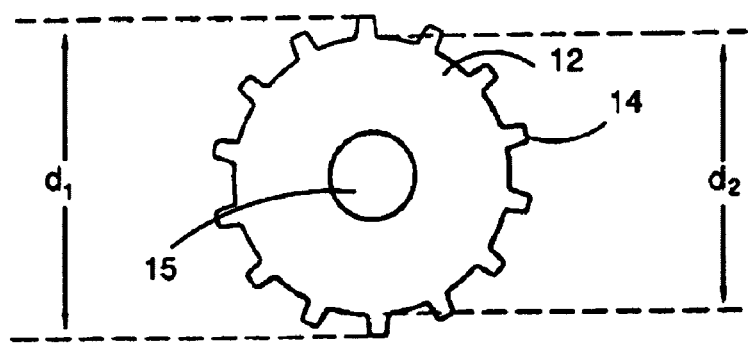
FIG. 1 shows a first gear of a transfer gear assembly used in the preferred embodiments.
Figure 2:
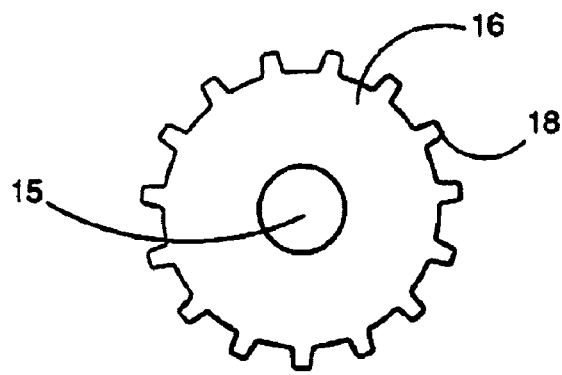
FIG. 2 shows a second gear of the transfer gear assembly.

With reference to FIGS. 1 and 2 a first gear and a second gear of a transfer gear assembly are shown. The first gear 12 has gear teeth 14 and the second gear 16 has gear teeth 18. The gear teeth 14 on the first gear 12 are of a different number to the gear teeth 18 on the second gear 16. Preferably the first gear 12 includes fourteen gear teeth and the second gear 16 has fifteen gear teeth.

Figure 3:
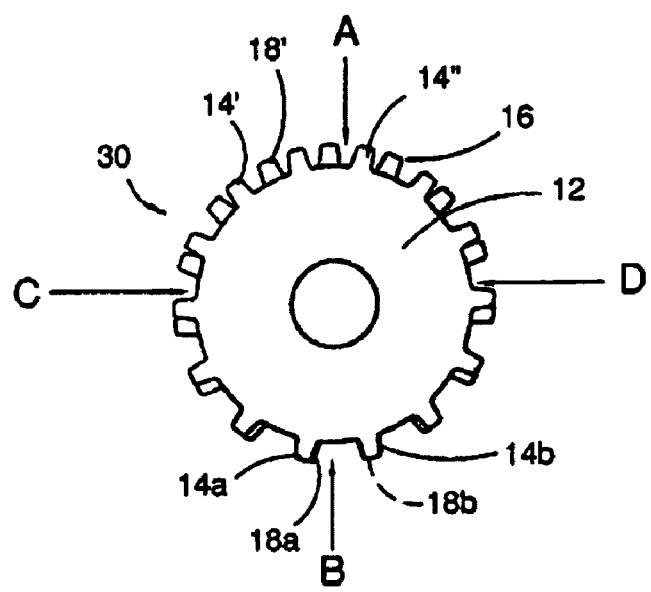
FIG. 3 shows the first and second gears of FIGS. 1 and 2 in an assembled condition.

The gears 12 and 16 have the same pitch circle diameter $d_1$ and in order to assemble the transfer gear assembly 30 the gears 12 and 14 are arranged in side by side relationship (ie one on top of the other), as shown in FIG. 3. Because the gears 12 and 16 have different numbers of teeth, when the gears are assembled as shown in FIG. 3 the teeth are out of phase with one another.

The gear 12 is designed by selection a module for the gear 12. The gear teeth must be properly formed involute teeth of that module. This is then the base Module. Next, with the pitch circle remaining the same some of the teeth are removed and the remaining ones evenly spaced about the root diameter $d_2$. This base module is the smallest pitch that the system will engage and the width between the now evenly spaced but fewer teeth, becomes the largest module that can be engaged. All elements of a pitch transfer gear 30 must have fewer teeth than the base gear, but also evenly spaced with the same root diameter.

For example, starting with the module base of 1.5, and a pitch circle diameter of 42 mm, the gear would normally have 28 teeth. If the largest pitch gear teeth that are to be engaged is to be modulus 3, then the gear 12 will have fourteen teeth, and the gear 16 will have fifteen teeth and so forth. Note that only two gears are required to make up transfer gear 30, but if a stronger transfer set is required it is acceptable to use multiple sets of gears. The further addition of gears with different numbers of teeth than the gears 12 and 16 can be used for special purposes explained later. Note that the actual number of teeth on any gear should be an integer.

The fixed pitch gears that the transfer gear 30 will engage are specially constructed except for the base gear 32. For example if modulus 1.5 ($\chi_1$ FIG. 4) is the base then the transfer gear 30 will engage a normal mod 1.5 gear 32 (see FIG. 4) with all its teeth. All other gears (such as gear 34 shown in FIG. 4), that the transfer gear 30 is able to properly engage mush have the same modulus tooth width and root depth (may have different pitch circles). The actual tooth profile will be different in only one aspect. It must have the same base module face profile and root depth but the distance between the leading and trailing face is infinitely variable up to the largest modulus that the transfer gear 30 is designed to engage. If, for instance that is to be modulus 3, then the width of the tooth at the pitch $\chi_2$ at the pitch circle must be the same as a standard mod 3 gear.

As shown in FIGS. 1, 2 and 3 the gears 12 and 16 have a central opening 15 so that the gears can be mounted on a shaft (not shown in FIGS. 1, 2 and 3) and so that the gear 12 and gear 16 can rotate on the shaft independently so that the gears can form the required pattern to present moduluses at points on the pitch circle diameter to allow engagement with the gears 32 and 34.

When the transfer gear assembly 30 is assembled as shown in FIG. 3 at one point, labeled A in FIG. 3, at the circumference of the gears 12 and 16 a gear tooth 16' of the gear 16 is at maximum phase difference with respect to adjacent gear teeth 14' and 14" of the gear 12. As one advances in the circumferential direction from the gear tooth 16' it will be seen that the phase relationship between teeth 18 of the gear 16 and the teeth 14 of the gear 12 slightly change their phase relationship to a position at point B (which is diametrically opposite point A) where gear teeth 14a and 18a and teeth 14b and 18b are substantially in phase or registration with one another. It will be seen that the teeth 14a and 18a are slightly out of registration in view of the different spacing between the teeth on the gear 16 compared with the teeth 14 and the gear 12.

At point A the teeth 16' and 14" define a pitch or modulus of a first value and at point B the teeth 14a, 18a and 14b, 18b define a pitch or modulus of a second value. For example, the pitch or modulus at point A can be 1.5 and the pitch or modulus at point B is 3. Thus, at point A the gear assembly 30 can engage a gear which has a standard modulus of 1.5 and at point B the gear assembly 30 can engage a gear having a standard modulus of 3. The teeth of the gears 12 and 16 between the points A and B defined, between adjacent teeth, modulus of values between 1.5 and 3. For example, at points C and D the modulus may be 2.

The transfer gear assembly shown in FIG. 3 therefore enables rotation be to transferred from a gear having a first pitch or modulus to a gear having a second pitch or modulus by arranging the first and second gears at appropriate points on the circumference shown in FIG. 3 where the modulus of one gear will enable meshing with the gear assembly 30 and the modulus of the other gear will enable meshing with the gear assembly 30.

Figure 4:
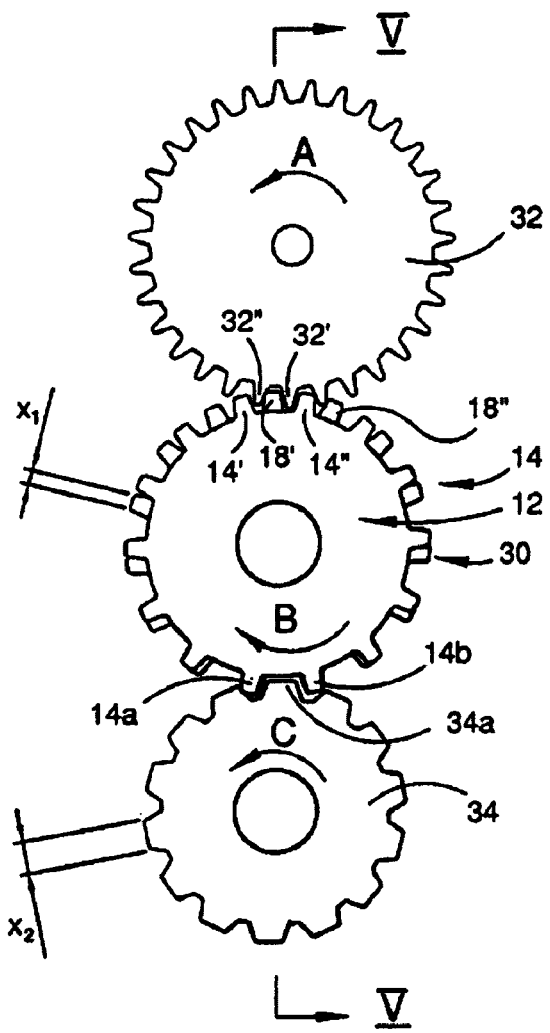
FIG. 4 is a view illustrating the principles of the pitch transfer gear assembly according to the preferred embodiment of the invention.

For example, in FIG. 4 an input gear 32 having a modulus of 1.5 is shown in mesh with the gear assembly 30 and an output gear 34 having a modulus of 3 is also in mesh with the gear assembly 30. As previously mentioned, transfer gear assembly 30 is therefore able to transfer motion from gear 32 having a first pitch or modulus to a gear 34 having a second pitch or modulus.

As is apparent from FIG. 4, a tooth 32' of the gear 32 is able to engage between tooth 14" of first gear 14 and tooth 18' of second gear 16. As the gear 32 rotates in the direction of arrow A gear tooth 32" is able to engage between tooth 18' of the second gear 16 and tooth 14' of the gear 12. As the transfer gear assembly 30 rotates in the direction of arrow B the gear 12 advances relative to the gear 16 so that by the time the tooth 14" has reached point B in FIG. 3 the tooth is no longer at maximum phase difference with the tooth 18' but has in fact now caught up with the tooth 18' so that it is in registry with the tooth 18' as shown by the teeth 14b and 18b in FIG. 3. The differential in speed is accommodated by the fact that the gears 12 and 16 are able to rotate relative to one another and caused by the fact that the gears 12 and 16 have different numbers of teeth. The tooth 14" will advanced one complete tooth spacing of the teeth on the gear 12 with respect to tooth 18" shown in FIG. 4 for each revolution of the gear 12. That is, in other words if the transfer gear 30 is rotated one revolution so that the tooth 14" returns to the exact position shown in FIG. 4 then the tooth 18" would have advanced only as far as the tooth marked 18' in FIG. 4.

As is also apparent in FIG. 4 because tooth 34a of gear 34 is in mesh between teeth 14a, 18a and 14b, 18b of the gear assembly 30, rotation is imparted to the gear 34 so that the gear 34 rotates in the direction of arrow C. It should be noted that the direction of rotation of the output gear 34 is in the same direction as the input gear 32.

Figure 5:
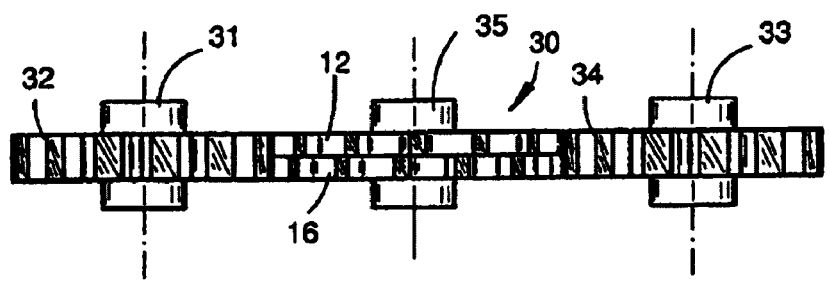
FIG. 5 is a cross-sectional view along the line V—V of FIG. 4.

The gears 32, 34 and 12 and 16 are supported on shaft 31, 33 and 35 respectively as best shown in FIG. 5. As is also apparent from FIG. 5, the gears 12 and 16 are half the thickness of the gears 32 and 34 so that when the gears 12 and 16 are assembled one on top of the other as shown in FIG. 5 then the thickness of the assembly 30 is the same as the thickness of the gears 32 and 34.

FIGS. 5A, 5B and 5C show a transfer gear 300 according to a further embodiment of the invention. The transfer gear of this embodiment of the invention has particular application in engaging a straight cut gear at one position about its periphery and a helical gear such as a worm gear at another place about its location. The transfer gear 300 includes three gears 302, 304 and 306.

Whilst a transfer gear of the type described with reference to FIGS. 1 to 4 is suitable for transferring motion from a helical gear having a constant helical angle along the length of the gear, to a straight cut gear, if the helical angle of the gear changes along the length of the gear the embodiment of FIG. 300 is preferred.

The gears 302, 304 and 306 are designed in the similar manner to that previously described. The gear 302 has, for example, fourteen teeth 302', the gear 304 fifteen teeth 304' and the gear 306 sixteen teeth 306'. At one position on the periphery of the transfer gear 300 such as that marked by arrow F the gears 302, 304 and 306 will enable engagement with a straight cut gear having a predetermined modulus. As shown in FIG. 5B a tooth designated $T_o$' (shown by extended dashed lines for ease of illustration) couples at least two of the teeth 302'–306', such as the teeth labeled 302" and 306" in FIG. 5B. At a different pitch spacing at another point tow different teeth may contact a tooth of the output gear. At another position such as that labeled by arrow G in FIG. 5A the gears will form a space which can receive a helical gear or thread of a worn or other helical cut gear. In order to transfer load from the worn gear or helical gear to the transfer gear 300 in preferred that at least tow of the three gears 302 to 306 engage with the helical thread of the helical gear. In FIG. 5C all three gears have teeth in engagement with the helical thread schematically shown by reference T' in FIG. 5C. However, as the helical angle of the thread T' changes with respect to the horizontal as shown by reference T" in FIG. 5C only two of the gears may engage the thread T" such as tooth 302" and 306" of the gears 302 and 306. The used of the three gears ensures that at least two of the gears will always engage the thread T' regardless of the change in helical angle of the thread T' with respect to the horizontal as depicted in FIG. 5C.

As in the earlier embodiment, the gears with less teeth will advance relative to the gears with more teeth as the gear rotates.

One primary use of the transfer gear assembly 30 described with reference to FIGS. 1 to 5 is simply to transfer rotation between two gears having different pitches or modulus. However, another use is in transmissions which can provide a continuously variable drive ratio between a minimum ratio and a maximum ratio.

Figure 6:
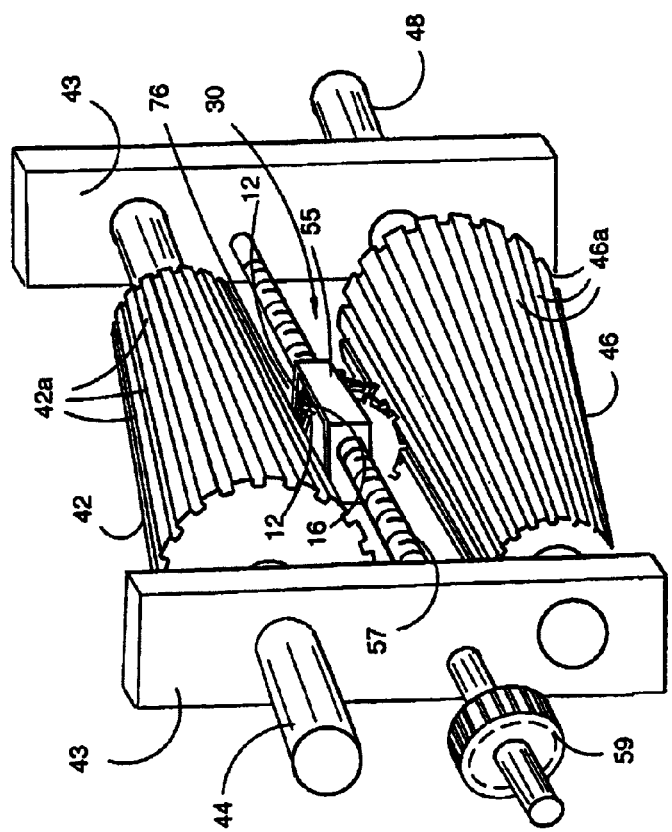
FIG. 6 shows a transmission according to one embodiment of the invention.
Figure 7:
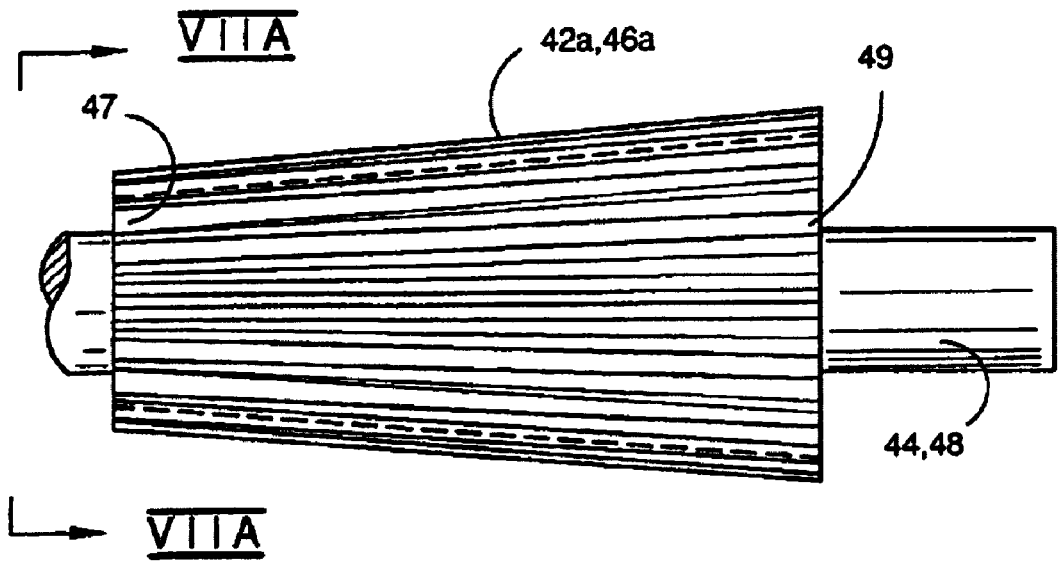
FIG. 7 is a view of a gear used in the transmission of FIG. 6.

FIGS. 6 and 7 show a transmission according to a first embodiment of the invention. With reference to FIG. 6 an input gear 42 is mounted in support 43 and has an input shaft 44. Rotary power is supplied to the input shaft 44 so as to rotate the gear 42. An output gear 46 is also supported by the support 43 on an output shaft 48. Transfer assembly 30 is mounted between the gears 42 and 46.

Figure 7A:
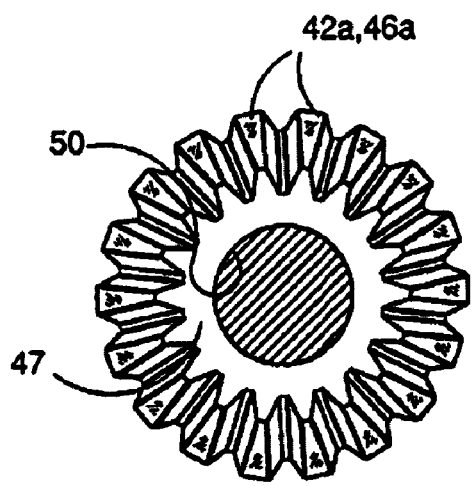
FIG. 7A is a view along the line VIIA—VIIA of FIG. 7.

As is best shown in FIGS. 7 and 7A the gears 42 and 46 are conical gears having gear teeth 42a, 46a which extend longitudinally along the gears 42 and 46 from a small diameter end 47 to a large diameter end 49. A bore 50 may be provided longitudinally through the gears 42 and 46 to accommodate the shafts 44 and 48. Alternatively the gears 42 and 46 can be integral with their respective shafts 44 and 48. As is apparent from FIGS. 6 and 7 the gear teeth 42a or 46a (as the case may be) extend longitudinally along the conical outer surface of the gears 42 and 46. The teeth 42a and 46a diverge away from one another as the teeth extend from small diameter end 47 to large diameter end 49, so that at the end 47 the teeth 42 have a modulus of one value and at the end 49 the teeth have a modulus of a second larger value. The spacing and therefore the modulus of the teeth 42 and 46 from the ends 47 and 49 vary continuously from the ends 47 to the end 49. As is apparent from FIG. 6 the gears 42 and 46 are mounted such that the small diameter end of one gear is adjacent the large diameter end of the other gear and therefore the surfaces of the gears 42 and 46 on which the teeth are provided are parallel to one another as best shown in FIG. 6.

The transfer gear assembly 30 is arranged between the gears 42 and 46 so that the first gear 12 and the second gear 16 engage the teeth 42a and 46a of the gears 42 and 46. As described with reference to FIGS. 1 to 5, the transfer gear assembly 30 is able to engage the gears 42 regardless of the modulus because of the phase relationship of the teeth of the gear 12 with respect to the gear 16. Thus as previously described the assembly 30 has a pitch or modulus of one value at one location and a pitch or modulus of another value at a different location.

At the position shown in FIG. 6 the pitch or modulus of the gears 42 and 46 where the transfer gear 30 engages the gears 42 and 46 are probably about the same because the transfer gear assembly 30 is at the mid point of the gears 42 and 46. Thus, the configuration of the first gear 12 and second gear 16 would be similar to that shown at points C and D in FIG. 3 where the transfer gear 30 engages the gears 42 and 46 because at that position of the gears 42 and 46 the modulus or pitch of the gear teeth 42a and 46a are the same.

In the embodiment of FIG. 6 two pairs of gears 12 and 16 are provided simply to increase the amount of torque which the transfer gear assembly can transfer. The gear assembly 30 is mounted in a block 55 which, in turn, receives a screw threaded shaft 57. A gear 59 is arranged at one end of the screw threaded shaft 57 and when the gear 59 is driven the shaft 57 is rotated so as to draw the block 55 along the screw threaded shaft. This changes the position of the transfer gear assembly 30 along the length of the gears 42 and 46 so that the drive ratio of the transmission can be changed as will be explained in more detail hereinafter.

As the gear assembly 30 moves along the length of the teeth 42a, 46a of the gears 42 and 46 the change in pitch or modulus of the gears 42a and 46 will cause a slight rotation of the gear 12 with respect to the gear 16 so as to place the teeth 14 and 18 of the respective gears at the required positions relative to one another to fit the modulus or pitch of the gears 42 and 46. For example, if the assembly 30 is moved to the left hand end in FIG. 6 the assembly 30 effectively takes up a position whereby the gears 42 and 46 will be engaging at points A and B shown in FIG. 3 and this simply occurs by a relative rotation of the gears 12 and 16 so that the gear teeth 14 for instance have moved slightly relative to the gear teeth 18 so that the points where the transfer gear assembly 30 engages the gears 42 and 46 the teeth have taken up positions identical to those shown by points A and B in FIG. 3. In this regard, it will be apparent that when the transfer assembly 30 is at the left hand end of the gears 42 and 46 the gear 42 has maximum pitch or modulus of, for example 3 and the gear 46 has minimum pitch or modulus of, for example 1.5.

At the position shown in FIG. 6 in which the transfer assembly 30 is at the mid point along the gears 42 and 46 the drive ratio of the transmission is effectively 1:1 because one rotation of the gear 42 will be transferred to one rotation of the gear 46 because the diameters of the gears 42 and 46 at the position of the transfer assembly 30 shown in FIG. 6 are the same. If the transfer assembly is moved to the left hand end of the gears 42 and 46 one rotation of the gear 42 will effectively cause more than one rotation of the gear 46 thereby decreasing the ratio while placing the transmission into a high gear. At the opposite end of the gears 42 and 46 one rotation of the gear 42 will produce only a part rotation of the gear 46 thereby placing the transmission into a low gear or high gear ratio. By adjusting the position of the transfer gear 30 part way along the length a particular drive ratio can therefore be selected between the maximum and minimum ratios and the ratio can be changed in a continuously variable manner between the minimum and maximum by positioning the transfer gear assembly 30 at any desired point along the length of the gears 42 and 46.

Thus, this embodiment of the invention enables gears having effectively different pitches (provided by immediately adjacent portions of the respective gears 42 and 46) which will be engaged by the assembly 30, to be provided. Thus, this provides a transmission having a continuously variable drive ratio by effectively providing different sized gears by virtue of the tapering of the gears 42 and 46 which are engaged as the transfer assembly 30 moves along the length of the conical gears 42 and 46.

Figure 8:
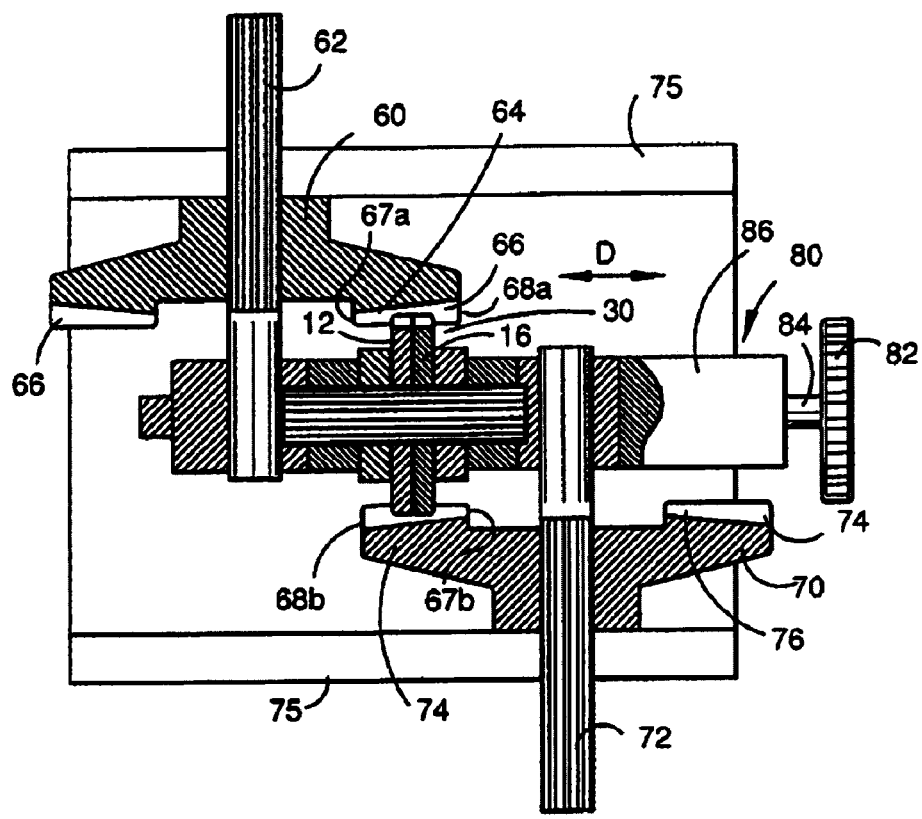
FIG. 8 is a view of a transmission according to a second embodiment of the invention.
Figure 8A:
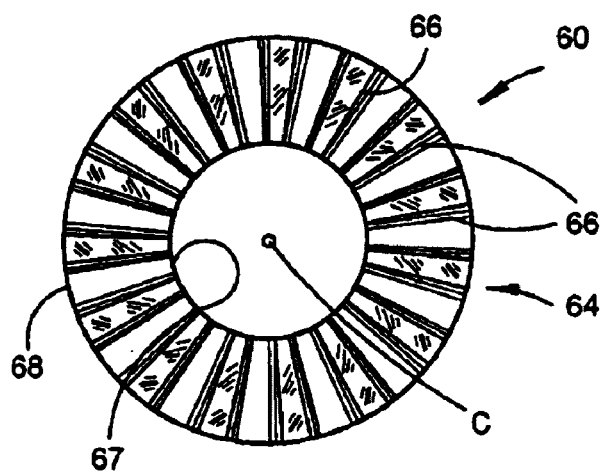
FIG. 8A is a view of a gear surface used in the embodiment of FIG. 8.

FIGS. 8 and 8A show a second embodiment of a transmission utilising the transfer gear assembly previously described. In this embodiment input gear 60 is mounted on input shaft 62 for supplying input rotary power. The input gear 60 has an annular gear face 64 on which gear teeth 66 are provided. An output gear 70 is provided on an output shaft 72 and also has an annular gear face 74 on which gear teeth 76 are provided. The shafts 62 and 72 can be mounted in suitable support or casing 75.

FIG. 8A shows a plan view of the gears 60 and 70 which, are identical and will be described with reference to the gear 60 for ease of illustration and explanation. The view shown in FIG. 8A shows the annular gear face 64. As apparent from FIG. 8 the gear 60 has an inner circumferential edge 67 and an outer circumferential edge 68. Gear teeth 66 extend from the inner edge 67 to the outer edge 68 radially from centre point C of the gear 60. The teeth 66 therefore change in pitch or modulus from inner circumference 67 to outer circumference 68 and as shown in FIG. 8A have a small pitch or modulus at the inner circumference 67 and a large pitch or modulus at the outer circumference 68. As is seen in FIG. 8A the teeth continuously change in modulus from the inner circumference 67 to the outer circumference 68.

As is apparent from FIG. 8, the gears 60 and 70 are arranged in partially overlapping configurations such that inner circumferential point 67*a* of the gear 60 is directly adjacent outer circumferential point 68*b* of the gear 70 and outer circumferential point 68*a* of the gear 60 is directly opposite and adjacent inner circumferential point 67*b* of the gear 70. Thus, the gears are arranged in similar manner to the gears described with reference to FIG. 6 in which the large pitch or modulus portion of one gear is opposite the small pitch or modulus of the other gear.

Transfer gear assembly 30 is mounted between the gears 60 and 70 so that the gears 12 and 16 engage the gear teeth 66 and 74. The gear assembly 30 is mounted in adjusting mechanism 80 which includes a thumb wheel 82 which can be rotated to drive a shaft 84 which is arranged within a casing 86 and which can move the casing 86 in the direction of double headed arrow D in FIG. 8. The gears 12 and 16 are supported on a shaft (not shown) supported by the casing 86.

When input rotary power is supplied to the shaft 62 the gear 60 is rotated about the axis of the shaft 62 the rotation of the gear 60 drives the gear assembly 30 so that the gear assembly 30 rotates about the longitudinal axis of the casing 86 on its shaft (not shown). This rotation is supplied to the gear 70 to cause the gear 70 to rotate about the longitudinal axis of output shaft 72 and therefore rotate the output shaft 72 for providing output rotary power.

The drive ratio of the transmission can be changed by rotating the thumb wheel 82 so as to move the gear assembly 30 in the direction of double headed arrow D along the gear teeth 66 and 74.

In similar fashion to describe with reference to FIG. 6, when the assembly 30 is arranged at the mid point of the teeth 66 and 74 as shown in FIG. 8 a 1:1 ratio is supplied. However, if the assembly 30 is moved to one end or the other end the ratio changes from 1:1 because of the effective change in gear diameter which is produced at the point of transfer. Thus, if the assembly 30 is moved all the way to the left in FIG. 6 it will gauge the inner circumferential portion of gear 60 and the outer circumferential portion of gear 74 thereby placing the transmission in lowest gear and if the assembly 30 is moved to the opposite end of the teeth 66 and 74 the transmission is placed in highest gear.

Figure 9:
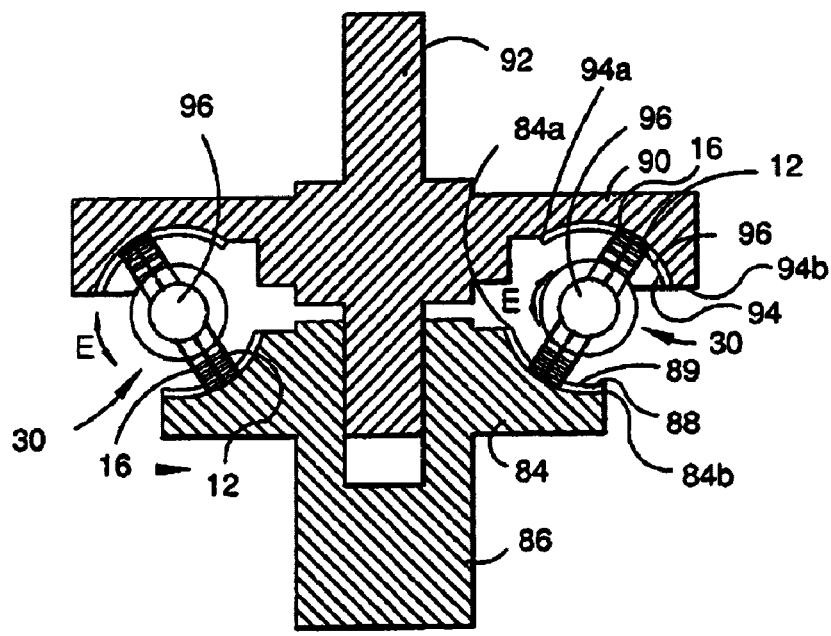
FIG. 9 is a view of a transmission according to a third embodiment of the invention.

FIG. 9 shows a further embodiment of a transmission. In this embodiment input gear 84 is arranged on input shaft 86 and has a toroidal gear face 88 into which curved gear teeth 89 are cut. As in the earlier embodiment the gear teeth effectively taper from inner circumferential position 84*a* to outer circumferential position 84*b* thereby providing a small pitch or modulus at the inner circumferential position 84*a* and a larger pitch or modulus at the outer circumferential point 84*b*. Output gear 90 is arranged on an output shaft 92 and has a gear face 94 of toroidal shape. Gear teeth 94 are cut into the toroidal face 94. Once again, the gears taper from inner peripheral portion 94*a* to outer peripheral portion 94*b* thereby providing a small modulus or pitch at the inner peripheral portion 94*a* and a larger modulus or pitch at the outer peripheral portion 94*b*.

Figure 10:
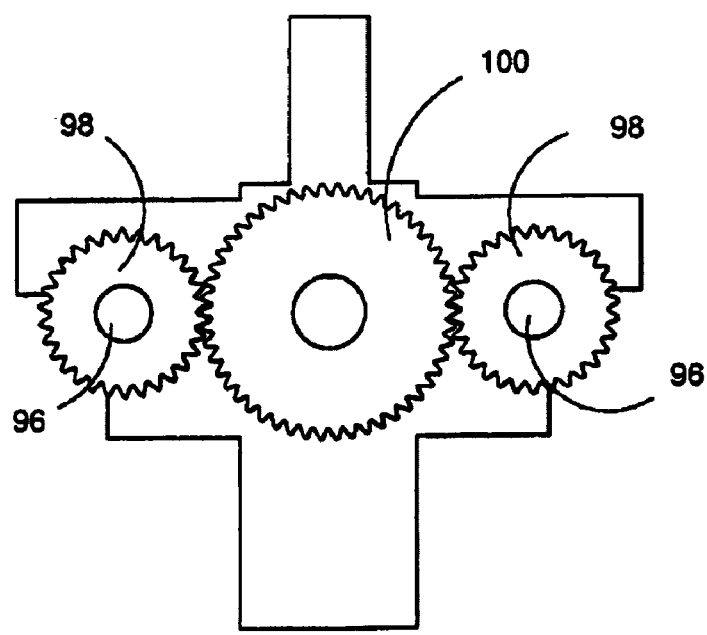
FIG. 10 shows one embodiment of the control system used in the embodiment of FIG. 9.

Transfer assemblies 30 are provided between the gear teeth 96 and 89 and, in the embodiments shown, two transfer gear assemblies 30 are provided. The transfer assemblies 30 are mounted on rotatable shafts 96 which as shown in FIG. 10 receive control gears 98. The control gears 98 mesh with the main control gear 100.

By rotating the control gear 100 the gears 98 are also rotated to thereby turn the shafts 96 in the direction of double headed arrows E in FIG. 9. This changes the position of the transfer gear assembly 30 so that the gear assembly 30 can extend between the outer circumferential point 94*b* of the teeth 96 and inner circumferential point 84*a* of the teeth 88 or between inner circumferential point 94*a* and outer circumferential point 84*b* or any position therebetween so as to set the drive ratio of the transmission.

The gears 12 and 16 of the gear assemblies 30 are mounted so that they can rotate into and out of the plane of the paper in FIG. 9 so as to transmit drive between the gears 84 and 90 to in turn transmit drive from the input shaft 86 to the output shaft 92. By adjusting the angular position in the direction of arrow E of the assemblies 30 the drive ratio of the transmission can be adjusted in the same manner as described with reference to the earlier embodiments.

Figure 11:
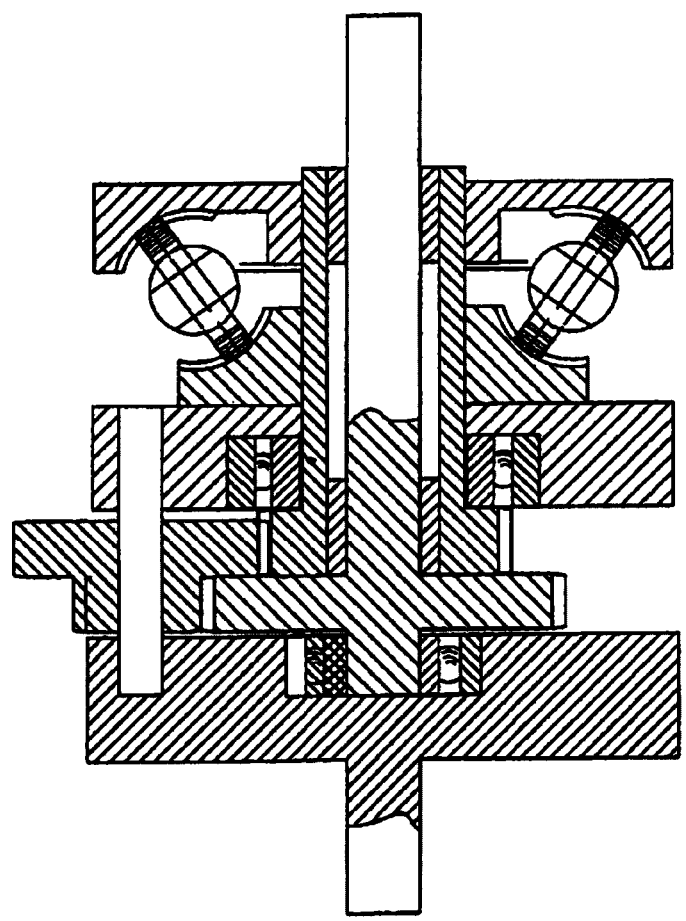
FIG. 11 shows a transmission according to a still further embodiment of the invention.

FIG. 11 shows yet a further embodiment of the invention which includes the same toroidal gear configuration as that described with reference to FIGS. 9 and 10. Similar reference numbers indicate like parts of those previously described. This embodiment includes a dual sunwheel system having a first sunwheel 102 connected to output shaft 104 and a second sunwheel 106 connected to a control shaft 108. The input rotary power is supplied to input shaft 109 which connected to cage 110 which carries spur clusters 112. The spur clusters 112 are mounted on shaft 114 carried by the cage 110 and include a first spurt gear 116 and a second spur gear 118. The gear 116 meshes with sun gear 102 and the gear 118 meshes with sun gear 106. The cage 110 is connected to the input gear 84 and the output gear 90 is connected onto control shaft 108.

Thus, when the input shaft 109 is rotated the cage 110 is rotated to in turn rotate the input gear 84. Drive is transmitted to the output gear 90 by the transfer gear assemblies 30 and once again, the drive ratio can be set by appropriate positioning of the gear assemblies 30 as described with reference to FIGS. 9 and 10. Rotation of the output gear 90 rotates the control shaft 108 which in turn rotates spur cluster 112 to rotate gear 102 and the output shaft 104.

The spur cluster 112 and the output sun gear 102 can thereby increase the range of gear ratios which can be selected so that very large ratios can be achieved.

Figure 12:
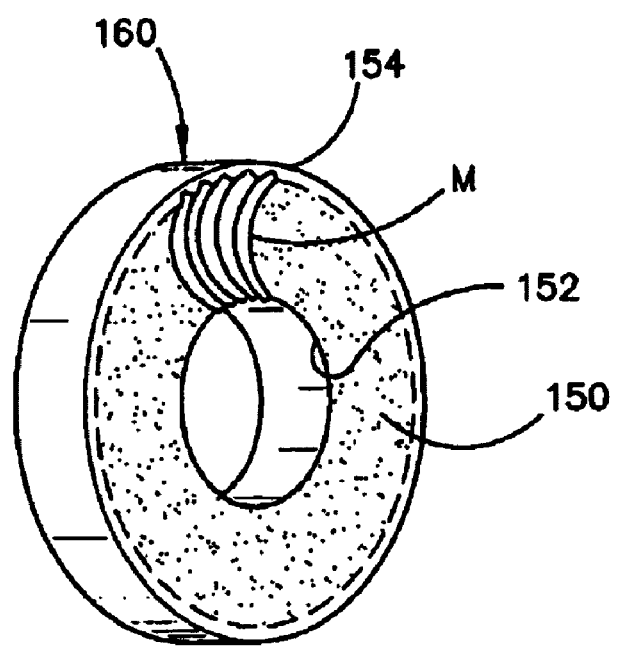
FIG. 12 is a diagram showing part of a toroidal gear used to assist explanation of the operation and construction of the embodiments of FIGS. 9, 10 and 11.
Figure 13:
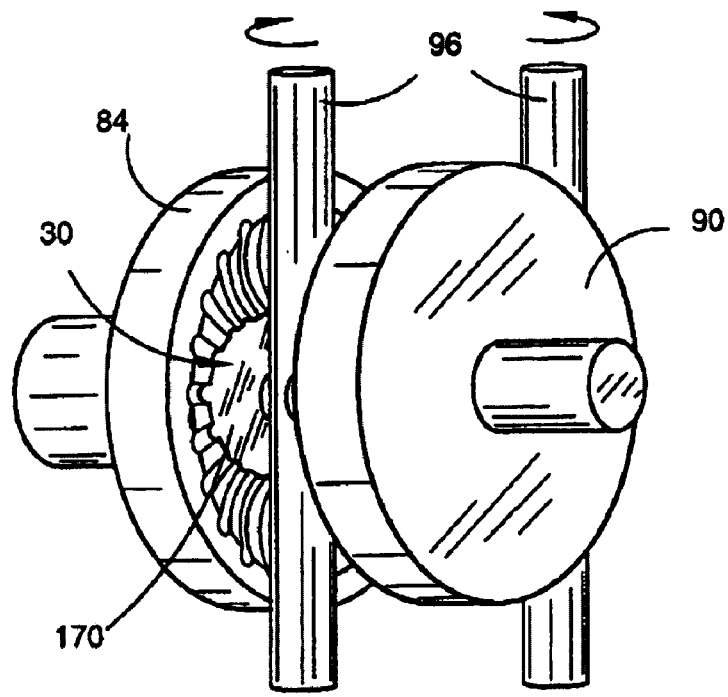
FIG. 13 is a perspective view of the toroidal gear arrangement used in the embodiments of FIGS. 9 to 11 to facilitate further explanation of the structure and operation of those transmissions.
Figure 14:
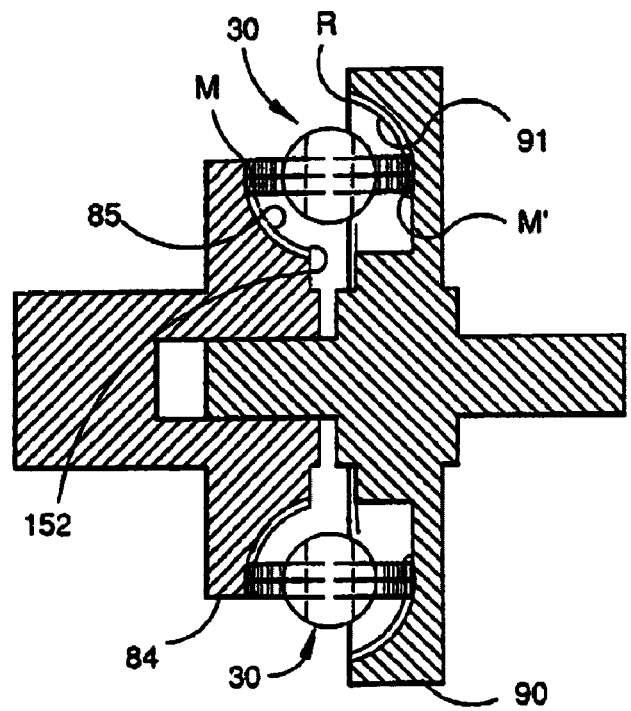
FIG. 14 is a cross-sectional view to further explain the structure and operation of the toroidal system.
Figure 15:
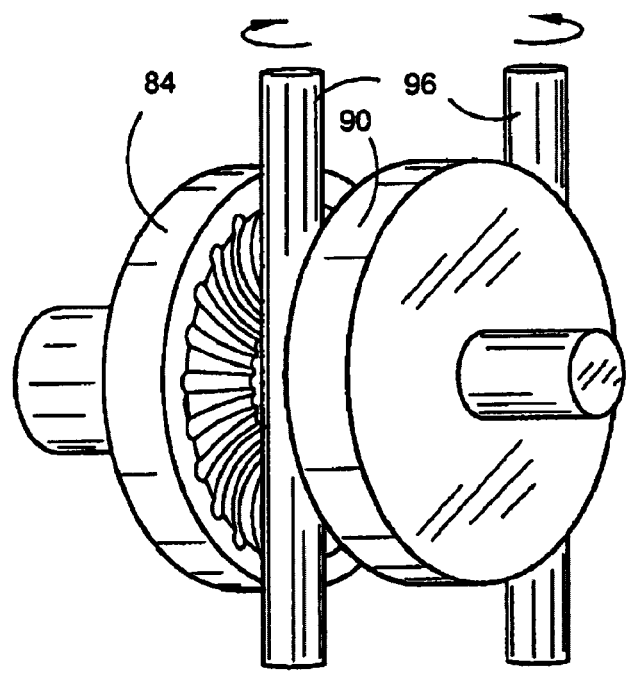
FIGS. 15 and 16 are views similar to FIGS. 13 and 14 but in a different operating condition.
Figure 16:
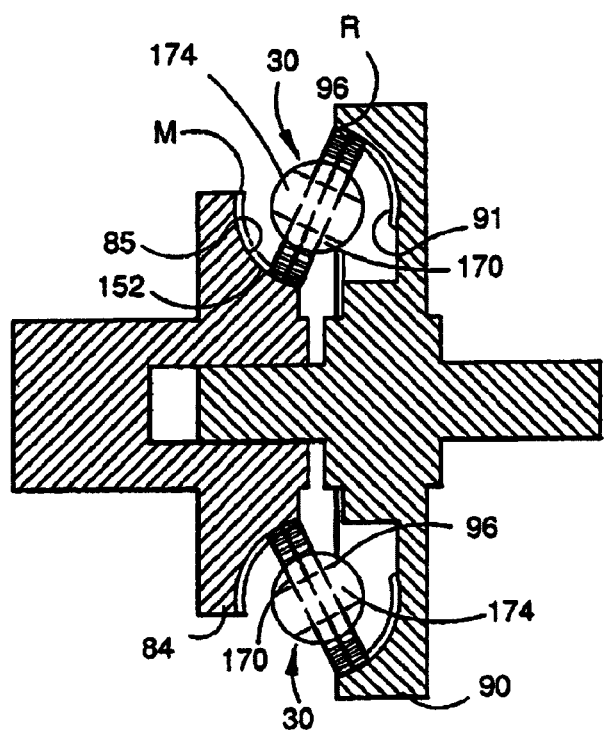

FIGS. 12 to 14 are diagrams showing how the toroidal gear arrangement of FIGS. 9 and 11 is constructed and operates.

As will be apparent in FIG. 12 if an annular groove 150 in a gear 160 is semi-circular in cross-section and if gear teeth are cut from the inner periphery 152 to the outer periphery 154, the gear teeth will have a minimum pitch adjacent inner periphery 152 and a maximum pitch at mid point marked M in FIG. 12 and then narrowed to a smaller pitch adjacent outer periphery 154. The pitch of the other periphery 154 is smaller than at mid point M and the pitch at the periphery 154 is larger than the pitch at the inner periphery 152.

The toroidal gears 84 and 90 of FIGS. 9 and 11 are not complete semi-circles in cross-section as is apparent from a consideration of FIGS. 9, 11 and also FIG. 14. The curved surface 85 of the gear 84 which forms part of the toroidal gears 84 and 90 extends for only part of the distance from the inner periphery 152 to the outer periphery 154 of the gear 160 shown in FIG. 12. For example, the part of the toroidal surface 85 may be that part from inner periphery 152 labeled in FIGS. 12 and 14 to mid point M also labeled in FIGS. 12 and 14. The part of the toroidal surface 91 of the gear 90 is part of the surface shown in FIG. 12 which extends from a point M' which corresponds in pitch with the point M (that is has the same pitch as the point M in FIG. 12) to a point R which is towards the outer periphery 154 which has a pitch greater than the pitch at the point 152 on the gear 84. In the position shown in FIG. 14 a 1:1 gear ratio is provided because the pitch at points M and M' is the same and therefore the drive provided by the gear 84 is directly transferred to the gear 90 by the transfer gear 30. If the gears 30 are rotated so as to move the transfer gears 30 to the position shown in FIGS. 15 and 16 in which the transfer gears 30 engage with the thread at position 152 adjacent the inner periphery of the gears 85 and the position R at the outer periphery of the gear 90 then a maximum reduction ratio can be provided because of the difference in pitch at the position 152 and the pitch at position R.

Thus, in FIGS. 13 to 16 it is shown that the transfer gear 30 extends between opposite (90°) quadrants of the annulus which are generally defined by the toroidal gears 84 and 90. The reason for this is that the pitch at the two engagement points of the pitch transfer gear so must be either inversely related to both of an intermediate pitches between the smallest and largest pitch able to be engaged.

FIGS. 13 to 16 also show in more detail the manner in which the individual gears which make up the transfer gear 30 are mounted on shafts 96 which can be turned by gears as described with reference to FIG. 10. The shafts 96 are provided with slots 170 (which is probably best apparent from a consideration of FIG. 13) provided in the shafts 96. The shafts 96 carry axles 174 in the slots on which the gears which make up the transfer gear 30 can rotate. The shafts 96, slots 170 and shafts 174 make up a gimbal control for controlling the position of the transfer gear 30 and also enabling the transfer gears 30 to rotate and engage with the gears 84 and 90.

As is apparent from the description of the previous embodiments, the transfer gear assembly 30 used in all of the previous embodiments utilises first and second gears which are in side-by-side relationship. The ramification of this is that each of the gears 12 and 16 (for example) in the transfer gear assembly 30, will engage the first input and output gears between which they transmit drive, on different pitch circle diameters.

FIGS. 17 to 21 show a further embodiment of the invention in which the transfer gear assembly 30 is formed by first and second gears which are not in side-by-side relationship, nor rotate about the same centre. Rather, the gears are separated from one another and rotate about different centres. This arrangement therefore allows the gears to be arranged on the same pitch circle diameter or, in other words, in the same plane, as will be described in more detail in relation to the embodiment of FIGS. 17 to 21.

Figure 17:
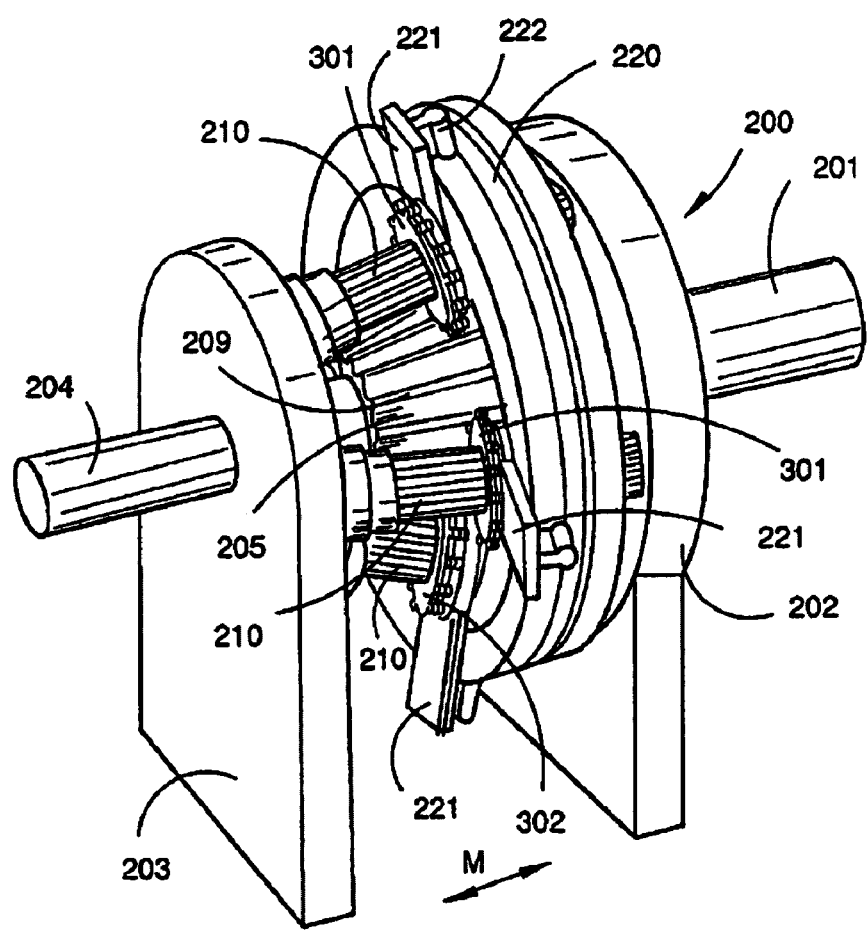
FIG. 17 is a view of a still further embodiment of the invention.
Figure 18:
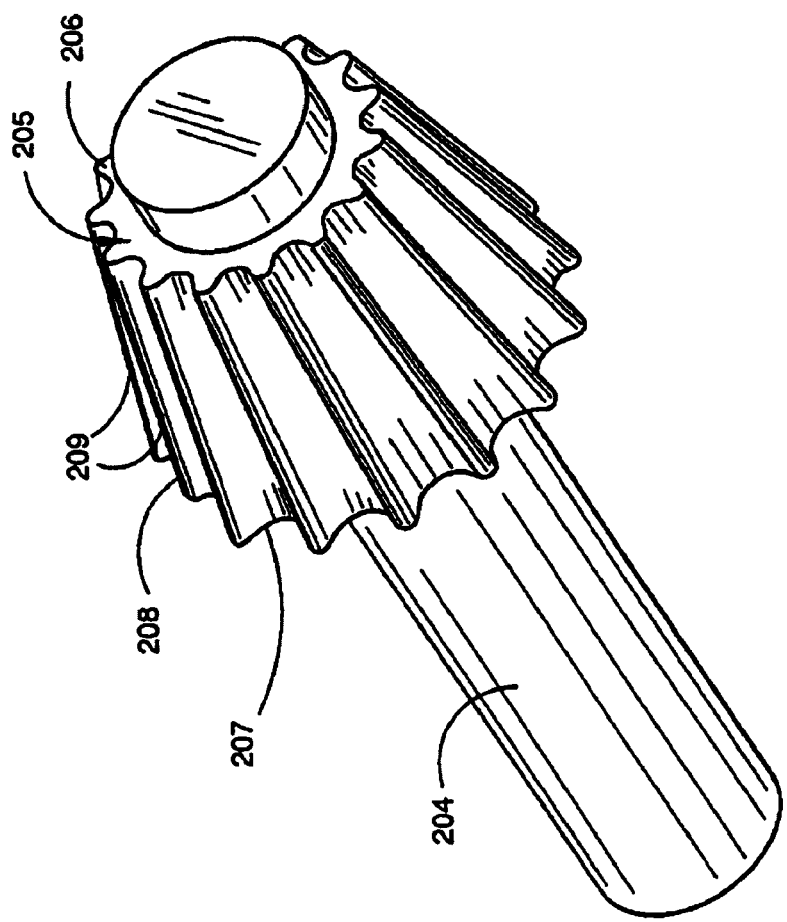
FIG. 18 is a perspective view of part of the embodiment of FIG. 17.
Figure 19:
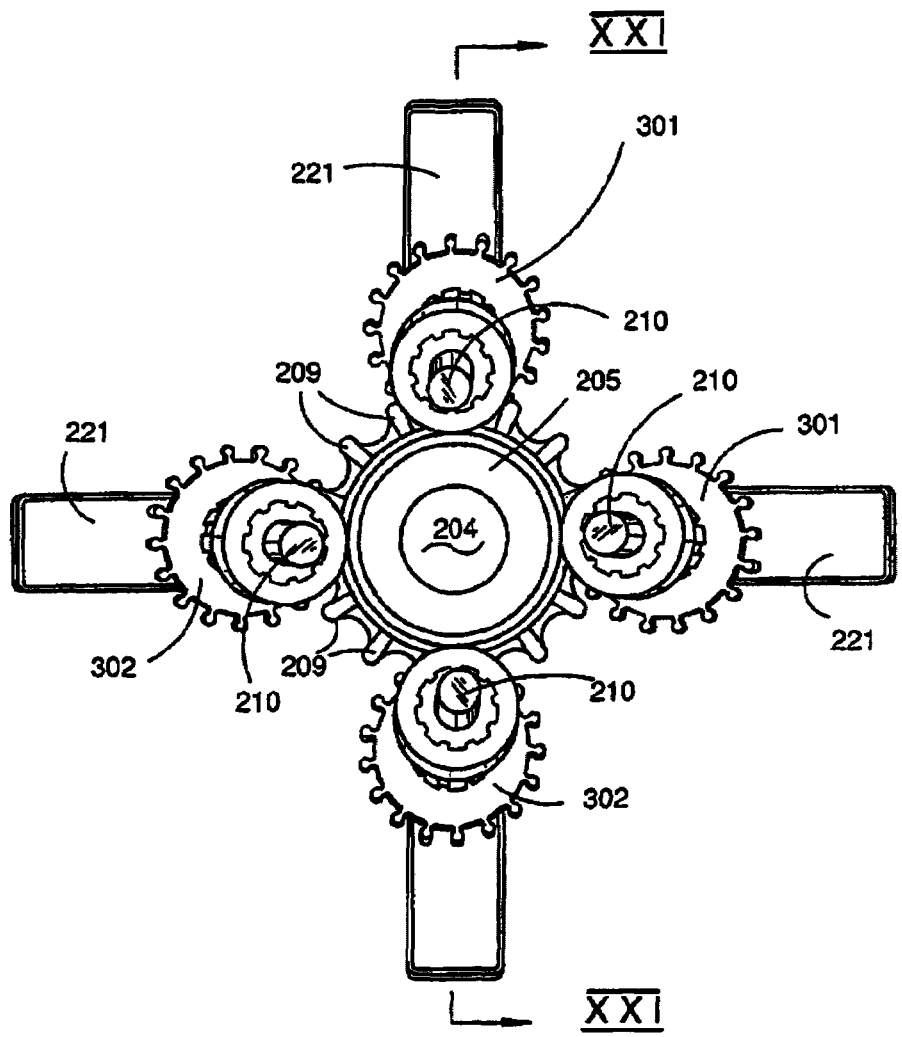
FIG. 19 is an end view of the embodiment of FIG. 17, with some of the components removed.

With reference to FIG. 17, a transmission 200 is shown which has an input shaft 201 journalled in casing frame 202. An output shaft 204 is journalled in a casing frame 203. The output shaft 204 is shown in perspective view in FIG. 18 and has a conical gear 205 mounted on it, which has a first end 206, a second end 207 and a conical surface 208. Elongate gears 209 are formed on the conical surface and the elongate gear 205 is therefore somewhat similar to the elongate conical gears shown in the embodiment of FIG. 6. As is apparent from FIG. 18, the gear teeth 209 diverge from the first end 206 to the second end 207, and therefore along the length of those gear teeth, form gears having a gradually increasing modulus from the end 206 to the end 207.

As is also apparent from FIG. 17, the casing parts 202 and 203 mount for rotation gear shafts 210. In the embodiment shown, four gear shafts 210 are provided, although only three can be seen in the view of FIG. 17. The gear shafts 210 are provided with splines 241 and are inclined with respect to the longitudinal axes of the shafts 201 and 204 (which are coincident) and are arranged parallel with the conical surface 209 of the conical gear 205. In other words, the basil axis of the gears 301, 302 are contained on a conical surface which is parallel to the cone of the gear 205.

In this embodiment of the invention, two transfer gear assemblies are provided. Each pair comprises a gear 301 and a gear 302. As is apparent from FIG. 19, the gears 301 and 302 in each pair are arranged generally opposed to one another, but not exactly 180° about the conical gear 205. The gears 301 and 302 are splined and engage the splines 241 of respective shaft 210 so the gears rotate with the shafts but can slide along the shafts 210.

Figure 21:
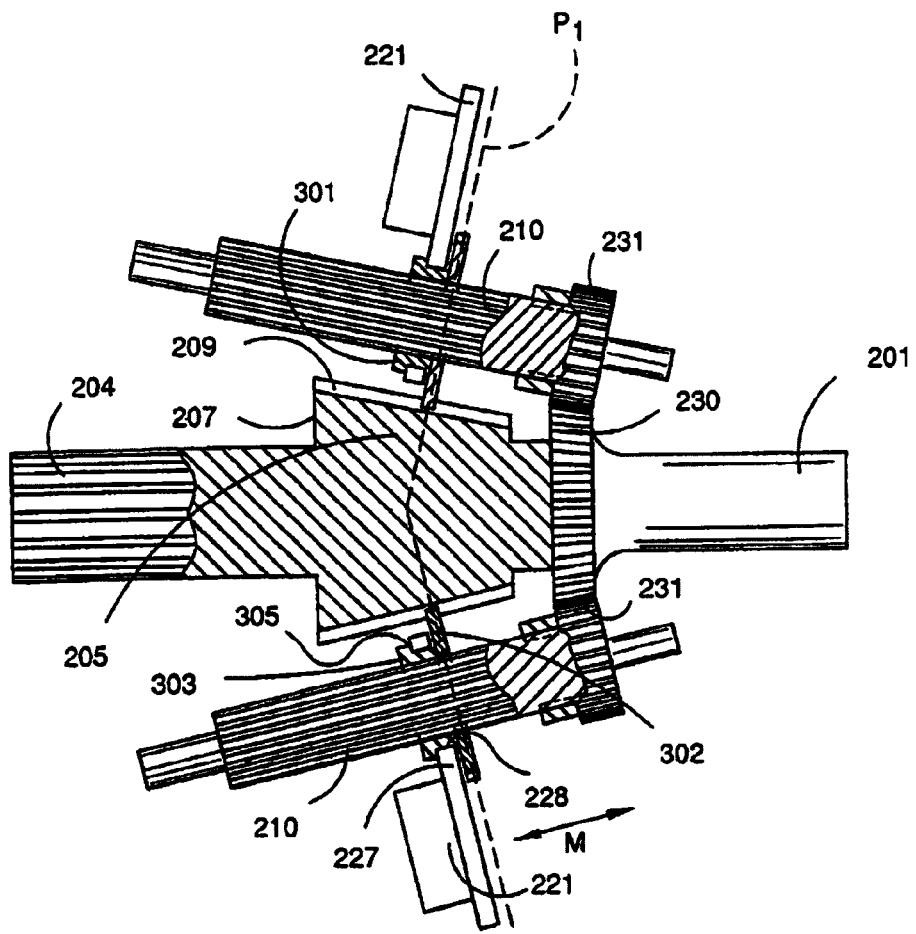
FIG. 21 is a cross-sectional view along the line XXI—XXI of FIG. 19.

A carrier ring 220 is mounted about the shafts 210 and the carrier ring 220 carries plates 221 which are mounted to the ring by a lug 222. The plates 221 project inwardly of the ring and are coupled to the gears 301 and 302 respectively. The manner of coupling the plates 221 to the gears 301, 302 is best shown in FIG. 21. The gear 302 includes a cylindrical hub 303 which is arranged diametrically inwardly of the gear teeth of the gear 302. The hub 303 has a peripheral groove 305 and the plate 221 carries a flange 227 which has a hole 228. The periphery of the hole 228 locates in the peripheral groove 305, so that the gear 302 can rotate relative to the plate 221, but longitudinal movement of the plate 221 in the direction of arrow M in FIG. 21 parallel to the shaft 210, will cause the gear 302 to move in the direction of double-headed arrow M along the shaft 210, as will be described in more detail hereinafter.

The carrier ring 220 is connected to a displacing mechanism such as a ram, or any other relatively accurately controllable device, so as to move the ring 220 in the direction of double-headed arrow M in FIG. 17 (which is the same direction as double-headed arrow M in FIG. 21) so as to slide the gears 301 along the splines 241 of shafts 210.

As is apparent from FIG. 21, input shaft 201 carries a drive gear 230. The drive gear 230 meshes with a plurality of timed pinion gears 231 which are mounted one each on the shafts 210. The gears 231 are fixed to the shafts 210 via the splines 241 previously mentioned, or by any other suitable coupling on the shafts 231, so that the shafts 231 will rotate with the gears 231. The pinions are timed with respect to one another so as to locate the shafts, and therefore the gears 301, 302 in a particular phase relationship with respect to one another so that the gears 301 and 302 contact the teeth 209 of the gear 205 at a particular position of the gears 301 and 302. The gears 301 and 302 can rotate relative to one another, as previously explained, however, the timing ensures that the gears commence in a particular orientation relative to one another so that they initially engage the gear 205.

Thus, when input rotary power is supplied to the input shaft 201, the gear 230 is rotated to rotate the pinions 231 and the shafts 210. Rotation of the shafts 210 rotate the gears 301, 302 so that the gears transmit drives to the conical gear 205 and hence, to the output shaft 204.

As is apparent from FIG. 21, the gears 301 and 302 of each transfer gear assembly are arranged in the same conical plane P1 shown in dotted lines in FIG. 21. In other words, each of the gears 301 and 302 mesh with the gear 205 on the same pitch circle diameter of the gear 205, and as is apparent from the previous description and the drawings, the gears 301 and 302 obviously rotate about different centres (which are the axes of the shafts 210). This is unlike the previous embodiments in which the two gears of each transfer gear assembly rotate about a common centre and, because they are in side-by-side relationship, engage the respective input or output gear (for example, the gears 42 and 46 of the embodiment of FIG. 6) on different pitch circle diameters. By making the gears which form each gear transverse pair in the previous embodiments as this as possible, the pitch circle diameters can be brought as close as possible together, but, the inherent result of the arrangement in the previous embodiments, is that the pitch circle diameters of the gears will never be coincident. The arrangement shown in the embodiment of FIGS. 17 to 22 enables the gears 301 and 302 which make up each transfer gear assembly, to engage the gear 205 at exactly the same pitch circle diameter.

The gears 301 and 302 are formed in the same manner as the gear pairs in the transfer gear assembly 30 described with reference to the previous embodiments and have different numbers of teeth. Each of the gears 301, 302 are rotatable relative to the gear 205 and because of the different numbers of teeth (or different gear modulus), of each gear 301 and 302, one of the gears will advance or regress relative to the other of the gears during one complete rotation of, for example, the gear 301. The engagement of the gear teeth on the gear 302, and engagement of the gear teeth on the gear 301 will be exactly the same as that described with reference to FIGS. 1 to 4, notwithstanding the fact that the gears 301 and 302 are arranged on different centres are separated from one another. Drive is transmitted from the gears 301 and 302 in exactly the same manner as drive is transmitted from the gear assembly 30 to the gear 34 in FIG. 4. However, it should b noted that the teeth of the gears 301, 302 only contact either a leading face or a trailing face of the teeth 209 and not both of those faces.

When it is desired to change the drive ratio of the transmission, the carrier ring 221 is moved in the direction of arrow M so that the gears 301, 302 slide on the shafts 221 and along the gears 209 of the gear 205 so as to change the position of the gears 301 and 302 on the conical gear 205 to a larger or smaller diameter part of the gear 205 and thereby change the drive ratio. The change in modulus presented by the gear 209 at the adjusted position of the gears 301 and 302, is accommodated by the gear pairs 301 and 302 in exactly the same manner as the earlier embodiments. That is, at the position shown in FIG. 21, the gears 301 and 302 take up a phase relationship with respect to one another such that, for example, the gear teeth of the gear 301 are at maximum phase displacement with respect to the gear teeth of the gear 302 at the points where the gears 301 and 302 engage the gear 205. Thus, drive is transmitted firstly by one of the gear teeth on the gear 301 engaging a gear tooth 205 and then one of the gear teeth on the gear 302 engaging a gear tooth 209 on the gear 205. This arrangement is identical to the manner in which engagement takes place between the gear 32 and 30 in FIG. 4. When the gears 301 and 302 are displaced from the position shown in FIG. 21, for example, towards the end 207 of the conical gear 205, the phase relationship between the gear teeth on the gears 301 and 302 may be such that the teeth are generally in phase, as shown in FIG. 4, where the gear teeth of the gear assembly 30 mesh with the gear 34. Thus, drive is transmitted from the gears 301 and 302 by gear teeth of those gears, substantially concurrently engaging different gear teeth 209 of the gear 207. Obviously, the phase relationship between the teeth and the gear 301 and 302 can change from the maximum phase displacement previously described, to the minimum or in phase displacement so that, regardless of the location where the gears 301 and 302 engage the gear 209 engage along the length of the teeth 209, drive will be transmitted from the gears 301, 302, to the gear 205.

Thus, drive is transmitted from the shafts 210, the gears 301, 302 of each transfer gear assembly, to the gear 205 and therefore to the output shaft 204, with the drive ratio between the input 201 and the output 204 being dependent on the location of the gears 301 and 302 along the length of the conical gear 205.

The other transfer gear pair shown in FIG. 17, operate in exactly the same manner. Obviously, if desired, more than two transfer gear assemblies could be utilised in the transmission if desired.

Figure 20:
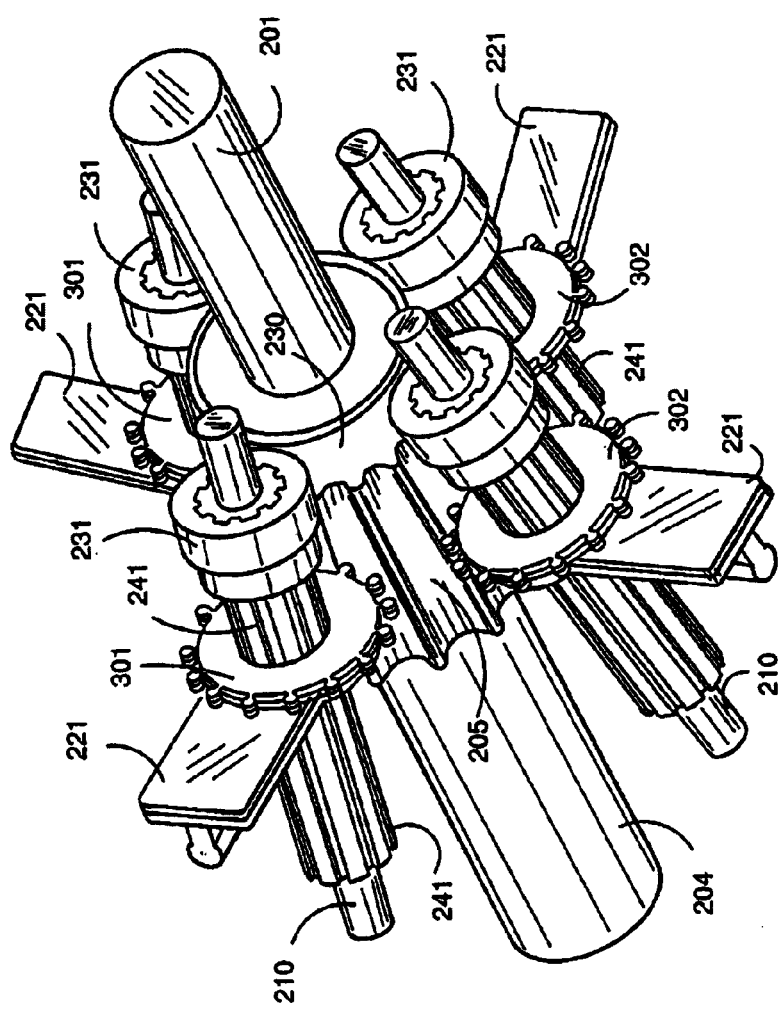
FIG. 20 is a perspective view of the arrangement shown in FIG. 19.

The splines 241 on the shafts 210, and which are best shown in FIG. 20, are, in the embodiments shown, parallel with the axis of the shaft 210. In other words, the splines 241 are straight. In other embodiments, the splines 241 could be helical splines so that when the gears 301 and 302 slide on the shafts 210 to reposition the gears relative to the gear teeth 209, the gears are caused to undergo some rotation. The small amount of additional rotation causes the teeth of the gears 301 and 302 to maintain contact with the gear tooth 209, if this is necessary due to the angle of divergence of the teeth 209 with respect to one another on the cone gear 205.

Figure 22:
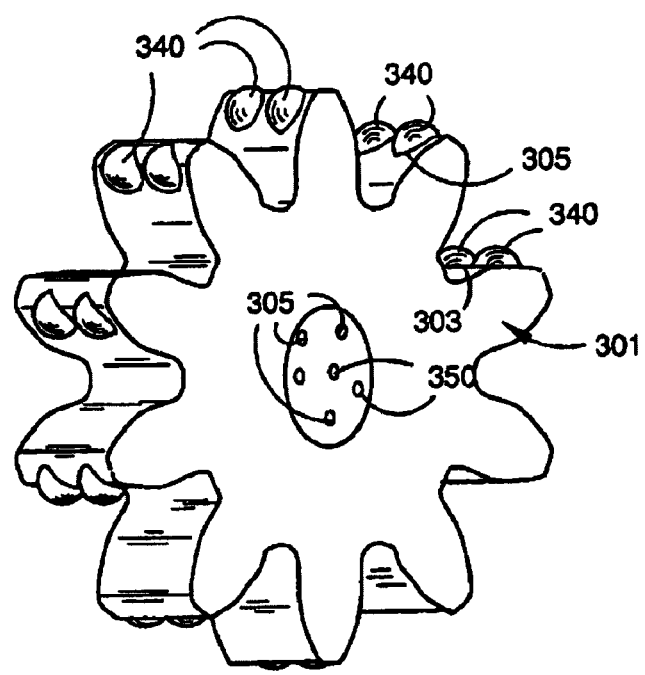
FIG. 22 is a view of a gear used in the embodiment of FIG. 17.

The engagement of the teeth of the gears 301 and 302 with the gear teeth 209, in this embodiment, will involve some sliding movement of the gear teeth of the gears 301 and 302 relative to the teeth 209. In order to facilitate smooth movement of the gears, the teeth of the gears 301 and 302 may be provided with ball rollers 340 as shown in FIG. 22. The ball rollers 340 are arranged in sockets 305 in the gear teeth of the gear 301. In the embodiments shown, two ball rollers 340 are provided in each of the teeth. However, in other embodiments, only a single ball roller could be provided. The use of two ball rollers provides greater load distribution and capacity for each of the gear teeth in the gear 301. Obviously, the gear 302 is formed in the same manner. The gear 301 may include oil channels 350 which extend from an inner periphery of the gear 301 where the gear mounts onto the spline shaft 210, to the sockets 305 for lubricating the balls 340 within the sockets 305.

The embodiment of FIGS. 17 to 20 could be altered such that drive is transmitted in the opposite direction, that is, the shaft 204 could be the input and the shaft 201 the output. The drive ratio of the transmission would be adjusted in precisely the same manner as previously described.

Since modifications within the spirit and scope of the invention may readily be effected by persons skilled within the art, it is to be understood that this invention is not limited to the particular embodiment described by way of example hereinabove.

What is claimed is:

1. A pitch transfer gear assembly for transmitting drive from one gear having gear teeth separated by a first pitch and another gear having gear teeth separated by a second pitch, said transfer gear assembly including:
   at least a first gear having a plurality of teeth;
   at least a second gear having a plurality of teeth different in number to the teeth of the first gear;
   the first and second gears having being arranged in side by side relationship so that the teeth of the first gear and the teeth of the second gear overlap one another with the teeth of the first gear and the teeth of the second gear being out of phase with one another; the first gear and the second gear being arrange for rotation independently of one another;

wherein at one position about the circumference of the first and second gears, the gear teeth of the first gear and the gear teeth of the second gear are out of phase with respect to one another by a certain amount and wherein the teeth of said one gear is able to engage the transfer gear assembly by a tooth of said one gear engaging in the space between a gear tooth of the first gear and a gear tooth of the second gear;

wherein at another location about the circumference of the first and second gears a further gear tooth of the first gear and a further gear tooth of the second gear have a phase relationship different to that at said one position, and a tooth of the said another gear is able to engage in the space between one of the teeth of the first gear and one of the teeth of the second gear; and wherein as drive is transmitted from the one gear via the transfer gear to the said another gear, the first gear of the transfer gear assembly advances with respect to the second gear of the transfer gear assembly.

2. The assembly of claim 1 wherein the difference in number between the teeth on the first gear and the teeth on the second gear is one.

3. The assembly of claim 1 wherein the number of teeth on the first gear is 14 and the number on teeth on the second gear is 15.

4. The assembly of claim 1 wherein the transfer gear assembly includes a third gear having a plurality of teeth different in number to the number of teeth of the first and second gears, the third gear being arranged in side by side relationship with the first and second gears and the gear teeth of the third gear being out of phase with respect to the teeth of the first gear and the second gear.

5. The assembly of claim 1 wherein the said one position about the circumference of the first and second gears is a position at which a tooth of the first gear and tooth of the second gear are out of phase with respect to one another by a maximum amount thereby providing a minimum modulus or pitch, and at said another location a gear tooth of the first gear and a gear tooth of the second gear are in registry or in phase with one another thereby providing a maximum pitch or modulus between adjacent teeth of the first and second gears.

* * * * *